United States Patent
Hallisey

(10) Patent No.: US 10,678,447 B2
(45) Date of Patent: Jun. 9, 2020

(54) CONTAINERIZING A BLOCK STORAGE SERVICE

(71) Applicant: Red Hat, Inc., Raleigh, NC (US)

(72) Inventor: Ryan Hallisey, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 165 days.

(21) Appl. No.: 15/649,079

(22) Filed: Jul. 13, 2017

(65) Prior Publication Data

US 2018/0018116 A1 Jan. 18, 2018

Related U.S. Application Data

(60) Provisional application No. 62/362,858, filed on Jul. 15, 2016.

(51) Int. Cl.
*G06F 3/06* (2006.01)
*G06F 9/54* (2006.01)
(Continued)

(52) U.S. Cl.
CPC ............ *G06F 3/0619* (2013.01); *G06F 3/065* (2013.01); *G06F 3/0607* (2013.01);
(Continued)

(58) Field of Classification Search
CPC ....... G06F 11/1448; G06F 2009/45579; G06F 2201/84; G06F 3/0607; G06F 3/0619;
(Continued)

(56) References Cited

U.S. PATENT DOCUMENTS

| 7,284,054 B2 | 10/2007 | Radhakrishnan |
| 9,262,127 B2 | 2/2016 | Patrick |
| (Continued) | | |

FOREIGN PATENT DOCUMENTS

CN 105530306 A 4/2016

OTHER PUBLICATIONS

Cacciatore et al. "Exploring Opportunities: Containers and OpenStack," OpenStack White Paper, 2015 (Year: 2015).*
(Continued)

*Primary Examiner* — Jay A Morrison
*Assistant Examiner* — Xiaoqin Hu
(74) *Attorney, Agent, or Firm* — Withrow & Terranova, PLLC

(57) ABSTRACT

Containerization of a block storage service. A scheduler component of a block storage service is initiated in a first container via a containerization technology. A log volume maintained by a host operating system is mounted to the first container to allow the scheduler component access to the log volume. An application programming interface (API) component of the block storage service is initiated in a second container via the containerization technology. The log volume is mounted to the second container to allow the API component access to the log volume of the host operating system. A volume component of the block storage service is initiated in a third container via the containerization technology. A device volume is mounted to the third container to allow the volume component access to the device volume of the host operating system.

20 Claims, 6 Drawing Sheets

(51) Int. Cl.
*G06F 11/14* (2006.01)
*G06F 9/455* (2018.01)

(52) U.S. Cl.
CPC .......... *G06F 3/0665* (2013.01); *G06F 3/0683* (2013.01); *G06F 3/0685* (2013.01); *G06F 9/45558* (2013.01); *G06F 9/544* (2013.01); *G06F 11/1448* (2013.01); *G06F 2009/45579* (2013.01); *G06F 2201/84* (2013.01)

(58) Field of Classification Search
CPC ...... G06F 3/065; G06F 3/0665; G06F 3/0683; G06F 3/0685; G06F 9/45558; G06F 9/544
See application file for complete search history.

(56) References Cited

U.S. PATENT DOCUMENTS

| | | | |
|---|---|---|---|
| 9,569,180 B1* | 2/2017 | Jiang | G06F 8/30 |
| 10,013,189 B1* | 7/2018 | Yang | G06F 3/0619 |
| 2005/0193222 A1 | 9/2005 | Greene | |
| 2007/0112574 A1 | 5/2007 | Greene | |
| 2016/0080489 A1* | 3/2016 | Ngo | H04L 67/1095 |
| | | | 709/219 |
| 2017/0235649 A1* | 8/2017 | Shah | G06F 11/1469 |
| | | | 707/649 |

OTHER PUBLICATIONS

Chris Evans "Docker storage 101: How storage works in Docker", Apr. 2015 (Year: 2015).*

Cacciatore, Kathy, et al., "Exploring Opportunities: Containers and OpenStack," OpenStack White Paper, 2015, 19 pages.

Fernandes, Joe, "A Container Stack for OpenStack (Part 1 of 2)," Red Hat Blog, An OpenStack Blog, Oct. 27, 2015, OpenStack, LLC, 10 pages.

Fussel, Mark, "Why a microservices approach to building applications?," www.github.com/msfussell, May 7, 2016, 9 pages.

Larsson, Magnus, "Building Microservices, part 4. Dockerize your Microservices," Blog, www.callistaenterprise.se/blogg/teknik/2015/06/08/building-microservices-part-4-dockerize-your-microservices/, Jun. 8, 2015, Callista Enterprise AB, 17 pages.

Martinelli, Nicole, "Moving from monolith to microservices: Lithium Technologies shares its hybrid-cloud strategy," User Stories, superuser.openstack.org/articles/movingfrommonolithtomicroserviceslithiumtechnologiessharesitshybridcloudstrategy, Jan. 4, 2016, 6 pages.

Mueller, Holger, "ClusterHQ enables persistent data containers with Flocker," Blog-News, www.constellationr.com/blog-news/clusterhq-enables-persistent-data-containers-flocker, Jun. 17, 2015, Constellation Research Inc., 4 pages.

Richardson, Chris, "Pattern: Microservices Architecture," www.microservices.io/patterns/microservices.html, 2014, 12 pages.

* cited by examiner

CONTAINERIZING A BLOCK STORAGE SERVICE

RELATED APPLICATIONS

This application claims the benefit of provisional patent application No. 62/362,858, filed on Jul. 15, 2016, entitled "CONTAINERIZING A BLOCK STORAGE LAYER IN AN INFRASTRUCTURE AS A SERVICE ENVIRONMENT," the disclosure of which is hereby incorporated herein by reference in its entirety.

TECHNICAL FIELD

This disclosure relates generally to a block storage service in a virtualized environment, such as an infrastructure as a service (IAAS) environment.

BACKGROUND

A block storage service is used in a virtualized environment to facilitate the creation and management of persistent storage by virtualized components, such as virtual machines, containers, compute instances, and the like.

SUMMARY

The examples containerize a block storage service, such as the Cinder block storage service of Openstack™, to implement components of the block storage service in individual containers. Among other features, containerizing the components of a block storage service eliminates certain dependency issues between the components and thereby facilitates, for example, individual upgrading of components of the block storage service.

In one example a method is provided. The method includes initiating a scheduler component of a block storage service in a first container via a containerization technology, and mounting to the first container a log volume maintained by a host operating system to allow the scheduler component access to the log volume. The method further includes initiating an application programming interface (API) component of the block storage service in a second container via the containerization technology, and mounting to the second container the log volume to allow the API component access to the log volume of the host operating system. The method further includes initiating a volume component of the block storage service in a third container via the containerization technology, and mounting to the third container a device volume maintained by the host operating system to allow the volume component access to the device volume of the host operating system.

In another example a computing device is provided. The computing device includes a memory and a processor device coupled to the memory. The processor device is to initiate a scheduler component of a block storage service in a first container via a containerization technology, and mount to the first container a log volume maintained by a host operating system to allow the scheduler component access to the log volume. The processor device is further to initiate an API component of the block storage service in a second container via the containerization technology, and mount to the second container the log volume to allow the API component access to the log volume of the host operating system. The processor device is further to initiate a volume component of the block storage service in a third container via the containerization technology, and mount to the third container a device volume maintained by the host operating system to allow the volume component access to the device volume of the host operating system.

In another example a computer program product is provided. The computer program product is stored on a non-transitory computer-readable storage medium and includes instructions configured to cause a processor device to initiate a scheduler component of a block storage service in a first container via a containerization technology, and mount to the first container a log volume maintained by a host operating system to allow the scheduler component access to the log volume. The instructions further cause the processor device to initiate an API component of the block storage service in a second container via the containerization technology, and mount to the second container the log volume to allow the API component access to the log volume of the host operating system. The instructions further cause the processor device to initiate a volume component of the block storage service in a third container via the containerization technology, and mount to the third container a device volume maintained by the host operating system to allow the volume component access to the device volume of the host operating system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
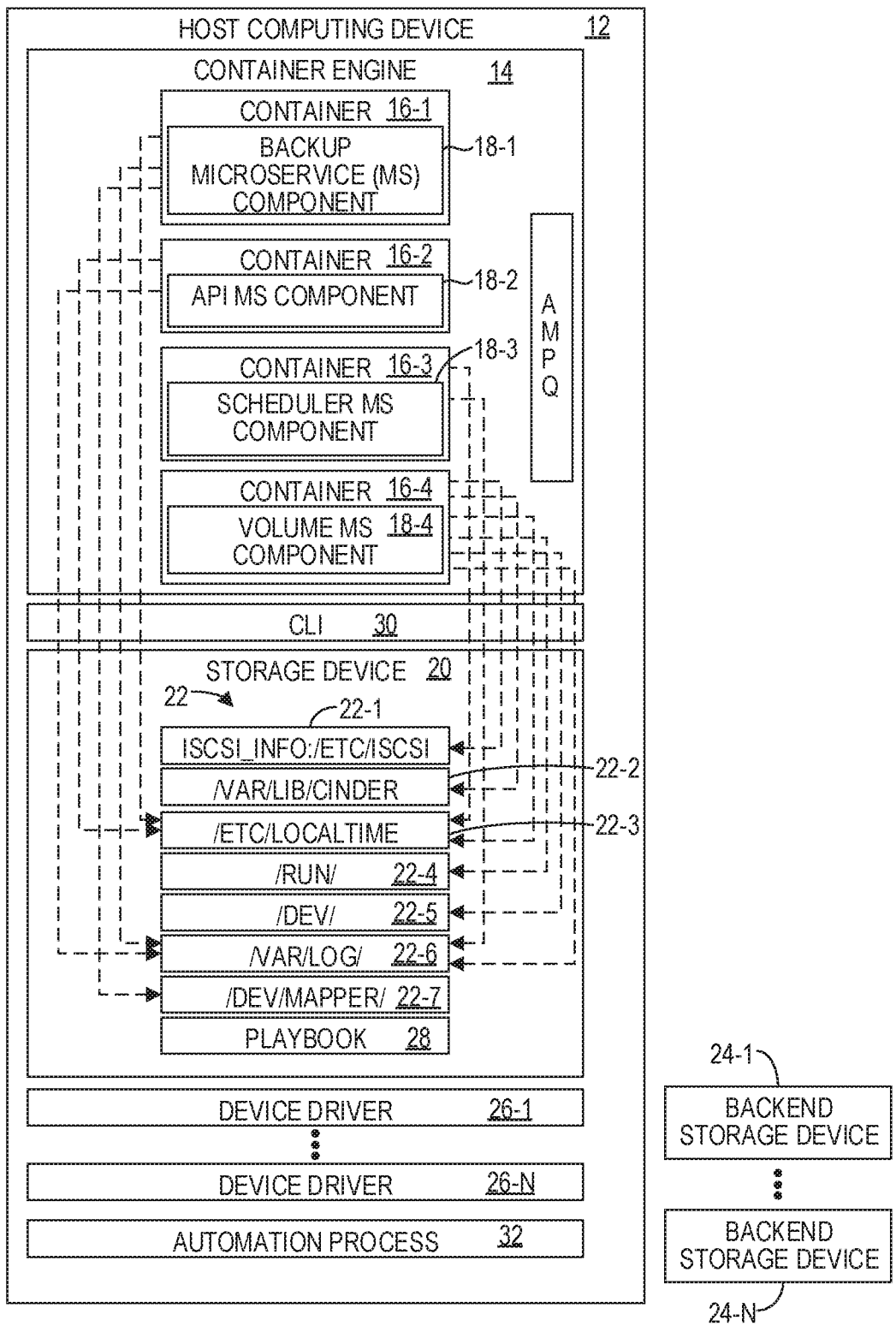
FIG. 1 is a block diagram of an environment for containerizing a block storage service according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first computing device" and "second computing device," and does not imply a priority, a type, an importance, or other attribute, unless otherwise stated herein. As used herein and in the claims, the articles "a" and "an" in reference to an element refers to "one or more" of the element unless otherwise explicitly specified.

The examples containerize a block storage service, such as the Cinder block storage service of Openstack™, to implement components of the block storage service in individual containers. Among other features, containerizing the components of a block storage service eliminates certain dependency issues between the components and thereby facilitates, for example, individual upgrading of components of the block storage service.

A block storage service is used in a virtualized environment to facilitate the creation and management of persistent storage by virtualized components, such as virtual machines and the like, that execute in a virtualized environment. Cinder, the block storage service of OpenStack™, is one example of a block storage service. While the examples will be discussed in the context of Cinder, the examples are not limited to Cinder and are applicable to any block storage service that requires access to certain directories on a host computer and that comprises a plurality of distinct executing processes. Moreover, the examples will be discussed in terms of the Docker containerization technology, but the examples have applicability to any containerization technology.

The Cinder block storage service comprises four components including Cinder-volume, Cinder-API, Cinder-scheduler, and Cinder-backup. The Cinder block storage service provides block storage support to virtualized components, such as virtual machines, containers, and the like. The Cinder block storage service requires direct access to certain host computer directories in order to provide block storage to such virtualized components. Because containers do not ordinarily have direct access to host computer directories, the Cinder block storage service conventionally executes as a native (i.e., non-containerized) process on a particular computing device (e.g., a host) on which virtualized components execute. However, executing the Cinder block storage service as a native process results in cross-project dependencies which, for example, require any updates to any Cinder component to be coordinated with each other Cinder component. This can negatively impact all running processes that are using the Cinder block storage service.

The examples containerize the components of a block storage service as micro-services in separate containers to eliminate such dependency issues. The examples, among other features, allow the individual components of the block storage service to be upgraded individually, as well as provide the other advantages of containerization to the Cinder block storage service, such as isolation, security, and the like. Containerization also facilitates use of the block storage service in a cloud environment, where individual components can execute on different compute instances. Thus for example, the Cinder-volume component, which is configured to receive a volume management request from the Cinder-API component and/or the Cinder-scheduler component, can run in one container and can be upgraded independently of the other Cinder components.

Similarly, the Cinder-API component, which is configured to expose an API to external processes for invocation, and which forwards a request received via the API to either the Cinder-scheduler component or the Cinder-volume component, can be run in another container and can also be upgraded independently of the other Cinder components.

The Cinder-scheduler component is configured to receive a request for a new volume, determine a particular backend storage device of a plurality of backend storage devices, and forward the request and an identifier of the particular backend storage device to the Cinder-volume component. The Cinder-scheduler component can also be run in another container and can also be upgraded independently of the other Cinder components.

FIG. 1 is a block diagram of an environment 10 for containerizing a block storage service according to one example. The environment 10 includes a host computing device 12, for example a Linux host computing device that executes a Linux operating system that manages the overall execution environment of the computing device 12. The computing device 12 includes a containerization technology, such as a Docker container engine 14, that implements containers on the computing device 12. While for purposes of illustration the examples discuss the use of the Docker containerization technology, the examples are not limited to any particular containerization technology. The container engine 14 executes, upon request, a plurality of containers 16-1-16-4 (generally, containers 16). Among other advantages, the container engine 14 implements operating system level virtualization for deploying and running distributed applications without having to launch an entire operating system for each such application. Thus, a container 16 requires fewer resources to run an application than other mechanisms, such as the use of a virtual machine.

Each of the containers 16-1-16-4 contains a block storage service component 18-1-18-4, such as the OpenStack™ Cinder block storage service. A block storage service is a service that provides persistent block storage resources for virtualized components, such as OpenStack™ compute instances, virtual machines, containers, and the like. While in this example, the block storage service is implemented in four components 18, the examples are not limited to any number of components 18.

The computing device 12 includes, or has access to, a storage device 20 that contains a number of volumes 22 of the computing device 12. The phrase "volume," as used herein, refers to both directories and files of the computing device 12 that are maintained by the Linux operating system that executes on the host computing device 12.

In order to provide the block storage service to virtualized components, the components 18 access, and in some cases, modify, certain of the volumes 22 maintained by the Linux operating system. For example, the component 18-1 is a backup component that accesses a log volume 22-6, a localtime volume 22-3 and a dev/mapper volume 22-7. The backup component 18-1 implements block storage backup services for the block storage service implemented by the components 18.

The component 18-2 is an application programming interface (API) component of the block storage service. The API component 18-2 exposes an API to external processes for invocation, and forwards a request received via the API to either a scheduler component 18-3 or a volume component 18-4. The API component 18-2 accesses the log volume 22-6 and the localtime volume 22-3.

The scheduler component 18-3 is a scheduler component of the block storage service. The scheduler component 18-3 is configured to receive a request for a new volume, determine a particular backend storage device 24 of a plurality of backend storage devices 24-1-24-N, and forward the request and an identifier of the particular backend storage device 24 to the volume component 18-4. The scheduler component 18-3 accesses the log volume 22-6 and the localtime volume 22-3.

The volume component 18-4 is a volume component of the block storage service. The volume component 18-4 is configured to receive a volume management request from the API component 18-2 and/or the scheduler component 18-3. The volume component 18-4 determines a backend storage device 24 to which the volume management request pertains, and communicates the volume management request to a particular device driver 26 of a plurality of device drivers 26-1-26-N associated with the backend storage device 24. The volume component 18-4 accesses an ISCSI volume 22-1, a Cinder volume 22-2, the localtime volume 22-3, a run volume 22-4, and the log volume 22-6.

With appropriate access to the volumes 22, the components 18 can provide the block storage service as a microservice for virtualized components, such as virtual machines, containers, and compute instances. In one example, the appropriate volumes 22 accessed by each particular component 18 is mounted to the container 16 in which the particular component 18 executes. In one example, the mounting may occur during the initiation of the particular component 18. For example, in a Docker container environment, a "run" command and "v" option followed by the appropriate volume or volumes may be sent to the container engine 14 to execute a container 16 and mount the appropriate volumes 22. In other container technologies, a corresponding command or commands may be used.

In one example, an operator may interact with the container engine 14 via a command line interface (CLI) 30 to initiate the containers 16 and mount the appropriate volumes 22. In another example, the appropriate commands may be stored in a configuration file or script, such as in a playbook 28. An automation process 32 may automatically, without human intervention, execute the playbook 28 to automatically initiate the container engine 14 and the components 18 in the containers 16, and mount the appropriate volumes 22 to the containers 16.

Figure 2A:
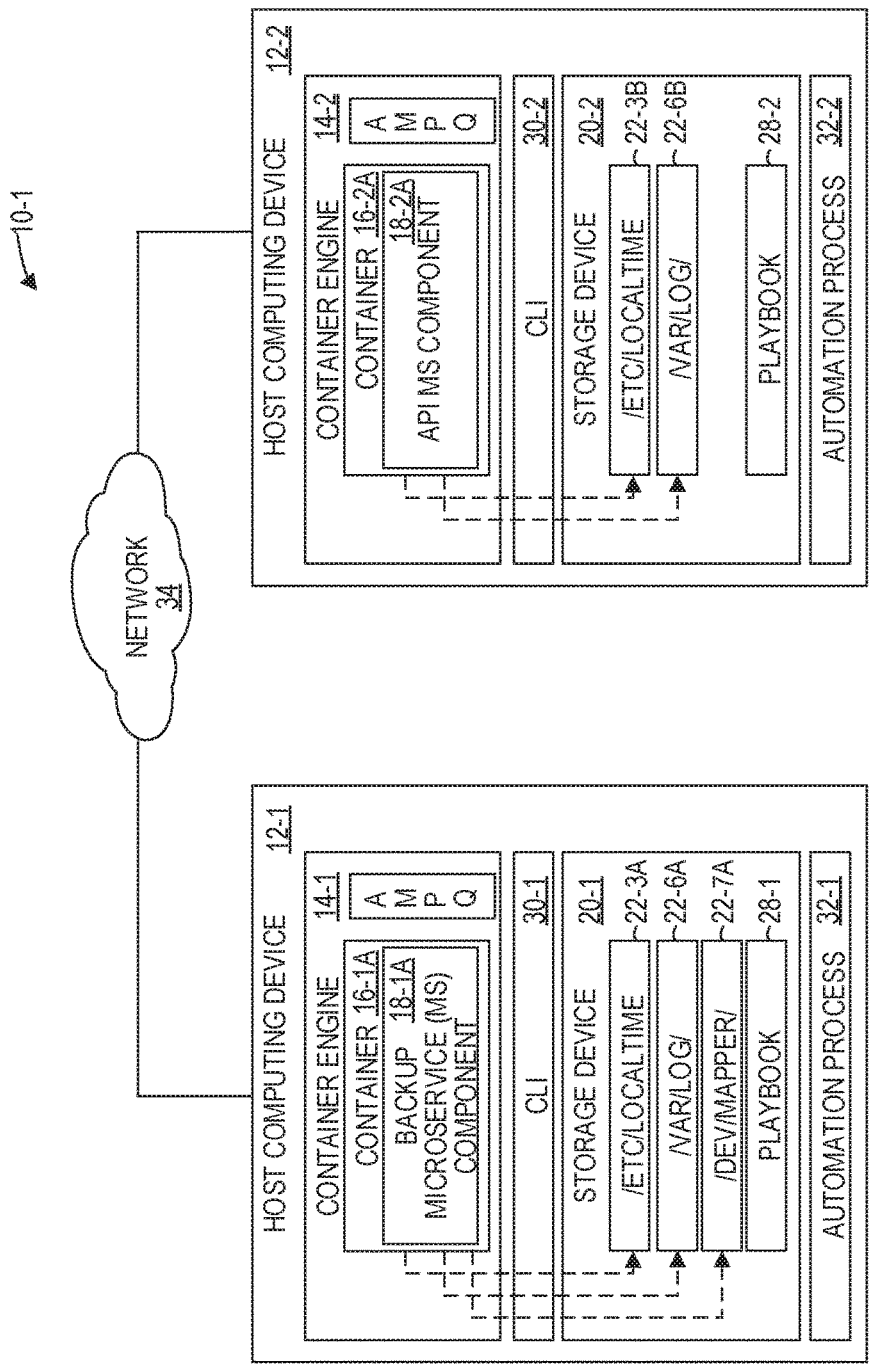
FIGS. 2A and 2B are block diagrams of an environment for containerizing a block storage service according to another example.
Figure 2B:
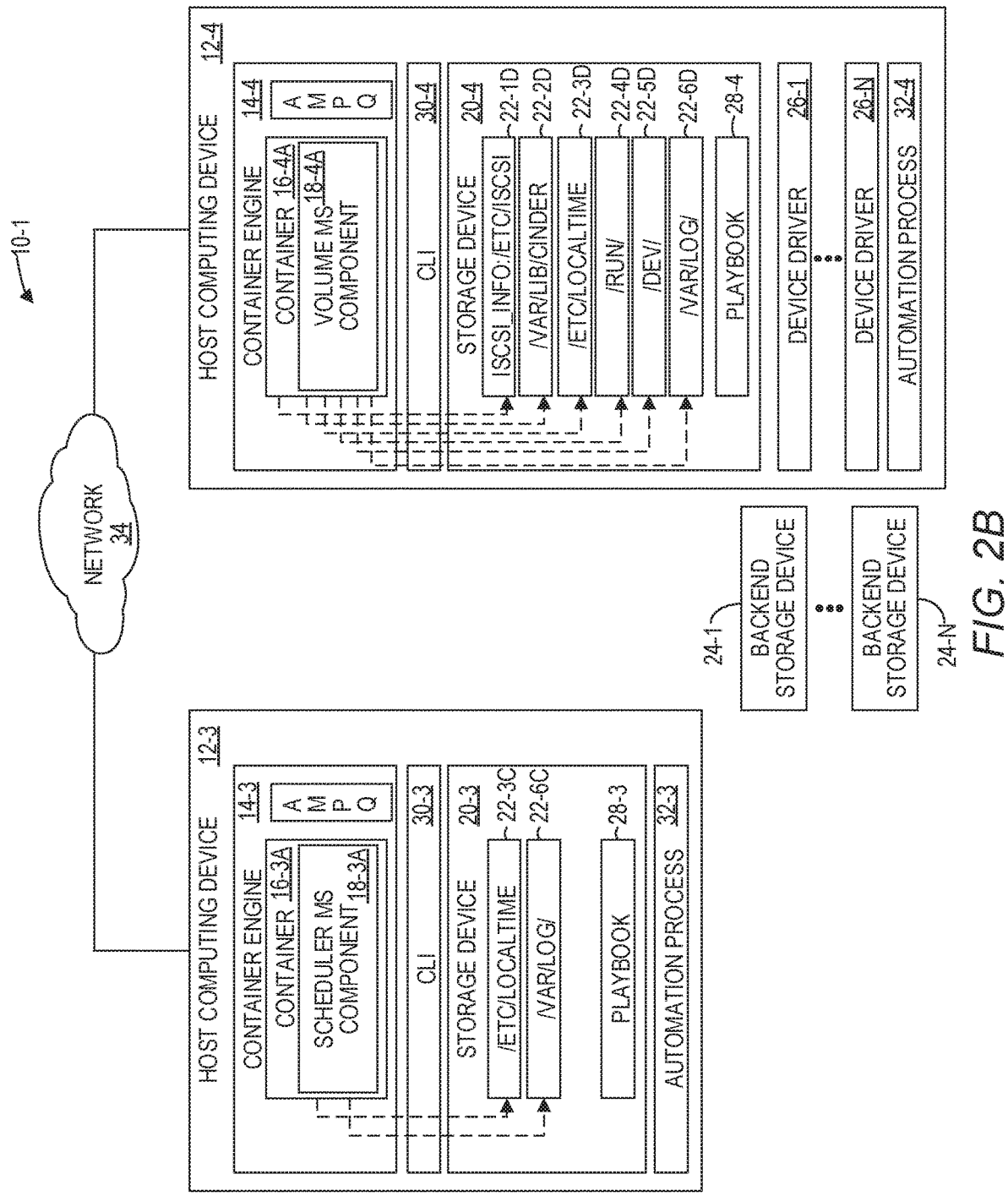

FIGS. 2A and 2B are block diagrams of an environment 10-1 in which another example is illustrated. In this example the environment 10-1 is similar to the environment 10, except that the components 18-1-18-4 are initiated in corresponding containers 16 on a plurality of separate host computing devices 12-1-12-4 (hereinafter computing devices 12-1-12-4). In particular, the computing device 12-1 includes a container engine 14-1. A backup component 18-1A is initiated in a container 16-1A in the container engine 14-1. The backup component 18-1A is configured similarly, or identically, to the backup component 18-1 discussed above with regard to FIG. 1. A localtime volume 22-3A, a log volume 22-6A, and a dev/mapper volume 22-7A maintained in a storage device 20-1 are mounted to the container 16-1A to facilitate access to such volumes 22 by the backup component 18-1A. The initiation of the backup component 18-1A in the container 16-1A and mounting of the volumes 22 may be accomplished via a user or operator via a CLI 30-1. Alternatively, this may be accomplished automatically, without human involvement, via an automation process 32-1 that executes a playbook 28-1 that contains suitable commands to initiate the backup component 18-1A in the container 16-1A, and mount the localtime volume 22-3A, the log volume 22-6A, and the dev/mapper volume 22-7A to the container 16-1A. The backup component 18-1A may communicate with the other components 18 of the block storage service executing on the computing devices 12-2-12-4 via one or more networks 34.

The computing device 12-2 includes a container engine 14-2. An API component 18-2A is initiated in a container 16-2A in the container engine 14-2. The API component 18-2A is configured similarly, or identically, to the API component 18-2 discussed above with regard to FIG. 1. A localtime volume 22-3B and a log volume 22-6B maintained in a storage device 20-2 are mounted to the container 16-2A to facilitate access to such volumes 22 by the API component 18-2A. The initiation of the API component 18-2A in the container 16-2A and mounting of the volumes 22 may be accomplished via a user or operator via a CLI 30-2. Alternatively, this may be accomplished automatically, without human involvement, via an automation process 32-2 that executes a playbook 28-2 that contains suitable commands to initiate the API component 18-2A in the container 16-2A, and mount the localtime volume 22-3B and the log volume 22-6B to the container 16-2A. The API component 18-2A may communicate with the other components 18 of the block storage service executing on computing devices 12-1, 12-3, and 12-4 via the one or more networks 34.

The computing device 12-3 includes a container engine 14-3. A scheduler component 18-3A is initiated in a container 16-3A in the container engine 14-3. The scheduler component 18-3A is configured similarly, or identically, to the scheduler component 18-3 discussed above with regard to FIG. 1. A localtime volume 22-3C and a log volume 22-6C maintained in a storage device 20-3 are mounted to the container 16-3A to facilitate access to such volumes 22 by the scheduler component 18-3A. The initiation of the scheduler component 18-3A in the container 16-3A and mounting of the volumes 22 may be accomplished via a user or operator via a CLI 30-3. Alternatively, this may be accomplished automatically, without human involvement, via an automation process 32-3 that executes a playbook 28-3 that contains suitable commands to initiate the scheduler component 18-3A in the container 16-3A, and mount the localtime volume 22-3C and the log volume 22-6C to the container 16-3A. The scheduler component 18-3A may communicate with the other components of the block storage service executing on computing devices 12-1, 12-2, and 12-4 via the one or more networks 34.

The computing device 12-4 includes a container engine 14-4. A volume component 18-4A is initiated in a container 16-4A in the container engine 14-4. The volume component 18-4A is configured similarly, or identically, to the volume component 18-4 discussed above with regard to FIG. 1. A localtime volume 22-3D, a device volume 22-5D, a log volume 22-6D, an ISCSI volume 22-1D, a Cinder volume 22-2D, and a run volume 22-4D maintained in a storage device 20-4 are mounted to the container 16-4A to facilitate access to such volumes by the volume component 18-4A. The initiation of the volume component 18-4A in the container 16-4A and mounting of the volumes 22 may be accomplished via a user or operator via a CLI 30-4. Alternatively, this may be accomplished automatically, without human involvement, via an automation process 32-4 that executes a playbook 28-4 that contains suitable commands to initiate the volume component 18-4A in the container 16-4A, and mount the localtime volume 22-3D, the log volume 22-6D, the ISCSI volume 22-1D, the Cinder volume 22-2D, and the run volume 22-4D to the container 16-4A. The volume component 18-4A may communicate with the other components of the block storage service executing on computing devices 12-1-12-3 via the one or more networks 34.

Figure 3:
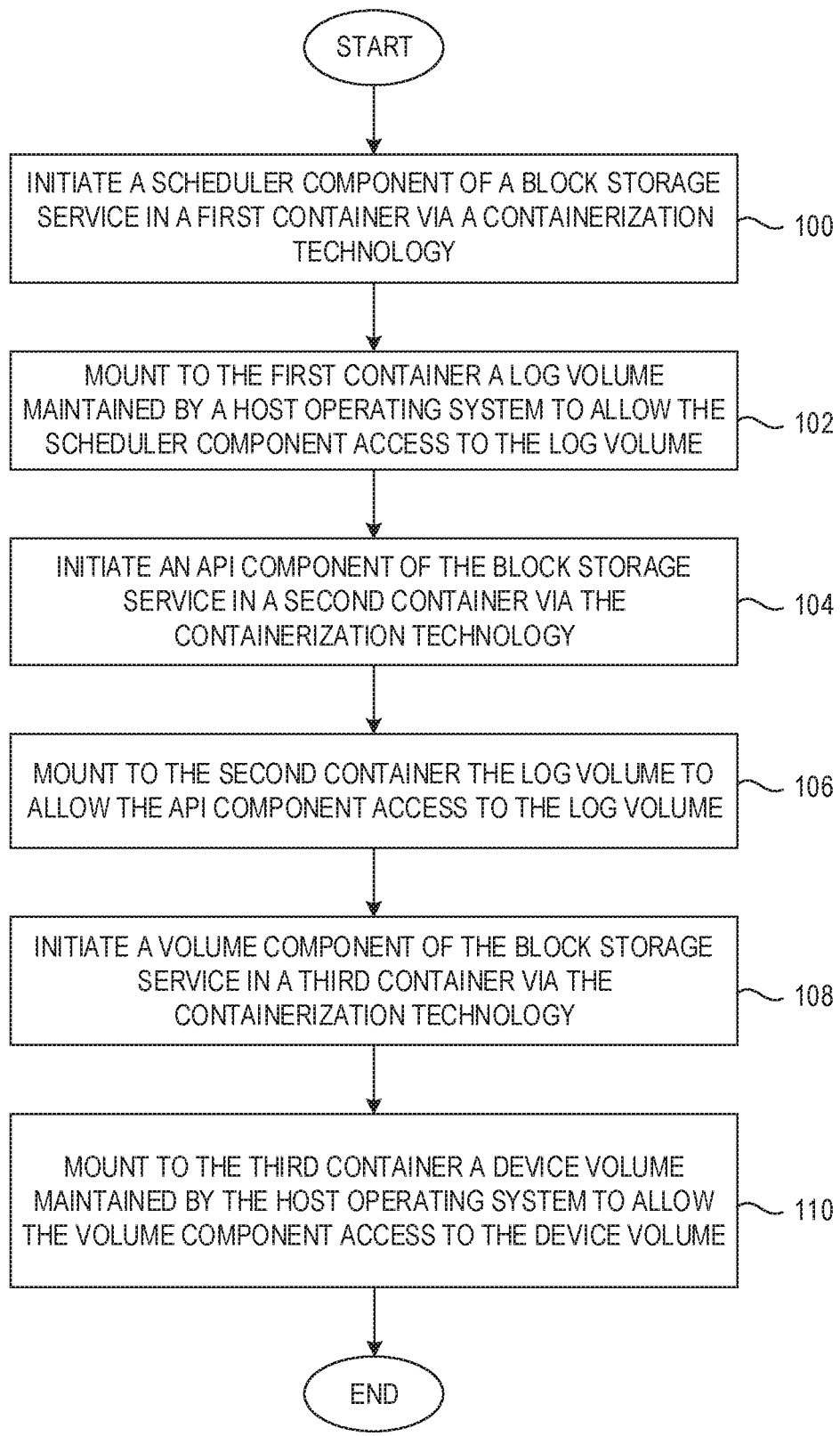
FIG. 3 is flowchart of a method for containerizing a block storage service according to one example.

FIG. 3 is a flowchart of a method for containerizing a block storage service according to one example. FIG. 3 will be discussed in conjunction with FIG. 1. The computing device 12 initiates the scheduler component 18-3 of a block storage service in the container 16-3 via a containerization technology such as the container engine 14 (FIG. 3, block 100). The computing device 12 mounts to the container 16-3 the log volume 22-6 maintained by the host operating system to allow the scheduler component 18-3 access to the log volume 22-6 (FIG. 3, block 102). The computing device 12 initiates the API component 18-2 of the block storage service in the container 16-2 via the container engine 14 (FIG. 3, block 104). The computing device 12 mounts to the container 16-2 the log volume 22-6 maintained by the host operating system to allow the API component 18-2 access to the log volume 22-6 (FIG. 3, block 106). The computing device 12 initiates the volume component 18-4 of the block storage service in the container 16-4 via the container engine 14 (FIG. 3, block 108). The computing device 12 mounts to the container 16-4 the device volume 22-5 maintained by the host operating system to allow the volume component 18-4 access to the device volume 22-5 (FIG. 3, block 110).

Figure 4:
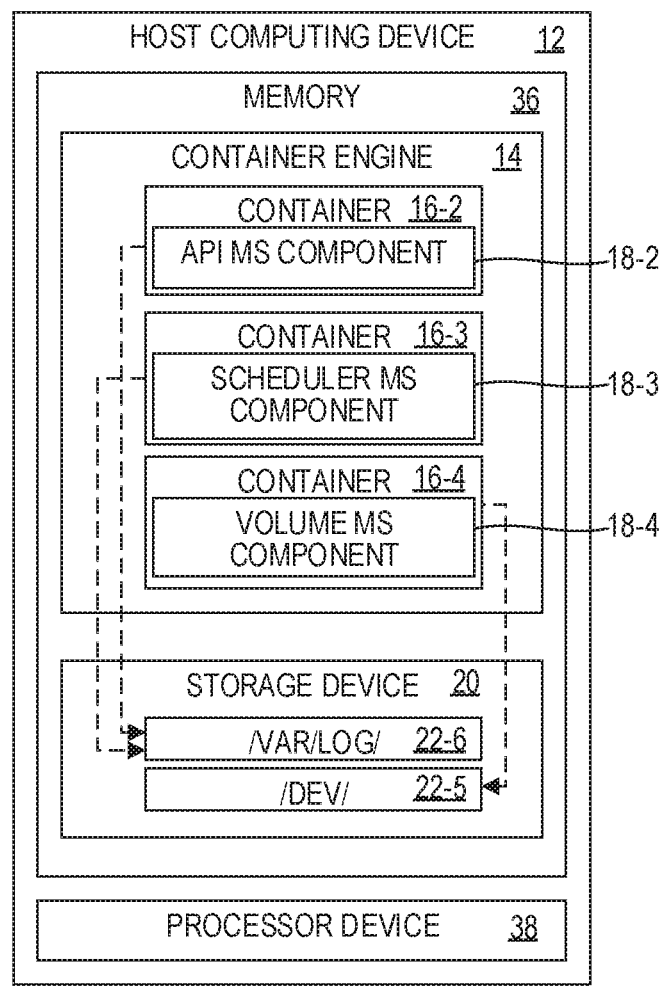
FIG. 4 is a simplified block diagram of the environment illustrated in FIG. 1 according to another example.

FIG. 4 is a simplified block diagram of the environment 10 illustrated in FIG. 1 according to another example. In this example the computing device 12 includes a memory 36 and a processor device 38 coupled to the memory 36. The processor device 38 initiates the scheduler component 18-3 of the block storage service in the container 16-3 via the container engine 14. The processor device 38 mounts to the container 16-3 the log volume 22-6 maintained by the host operating system to allow the scheduler component 18-3 access to the log volume 22-6. The processor device 38 initiates the API component 18-2 of the block storage service in the container 16-2 via the container engine 14. The processor device 38 mounts to the container 16-2 the log volume 22-6 to allow the API component 18-2 access to the log volume 22-6. The processor device 38 initiates the volume component 18-4 of the block storage service in the container 16-4 via the container engine 14. The processor device 38 mounts to the container 16-4 the device volume 22-5 to allow the volume component 18-4 access to the device volume 22-5.

Figure 5:
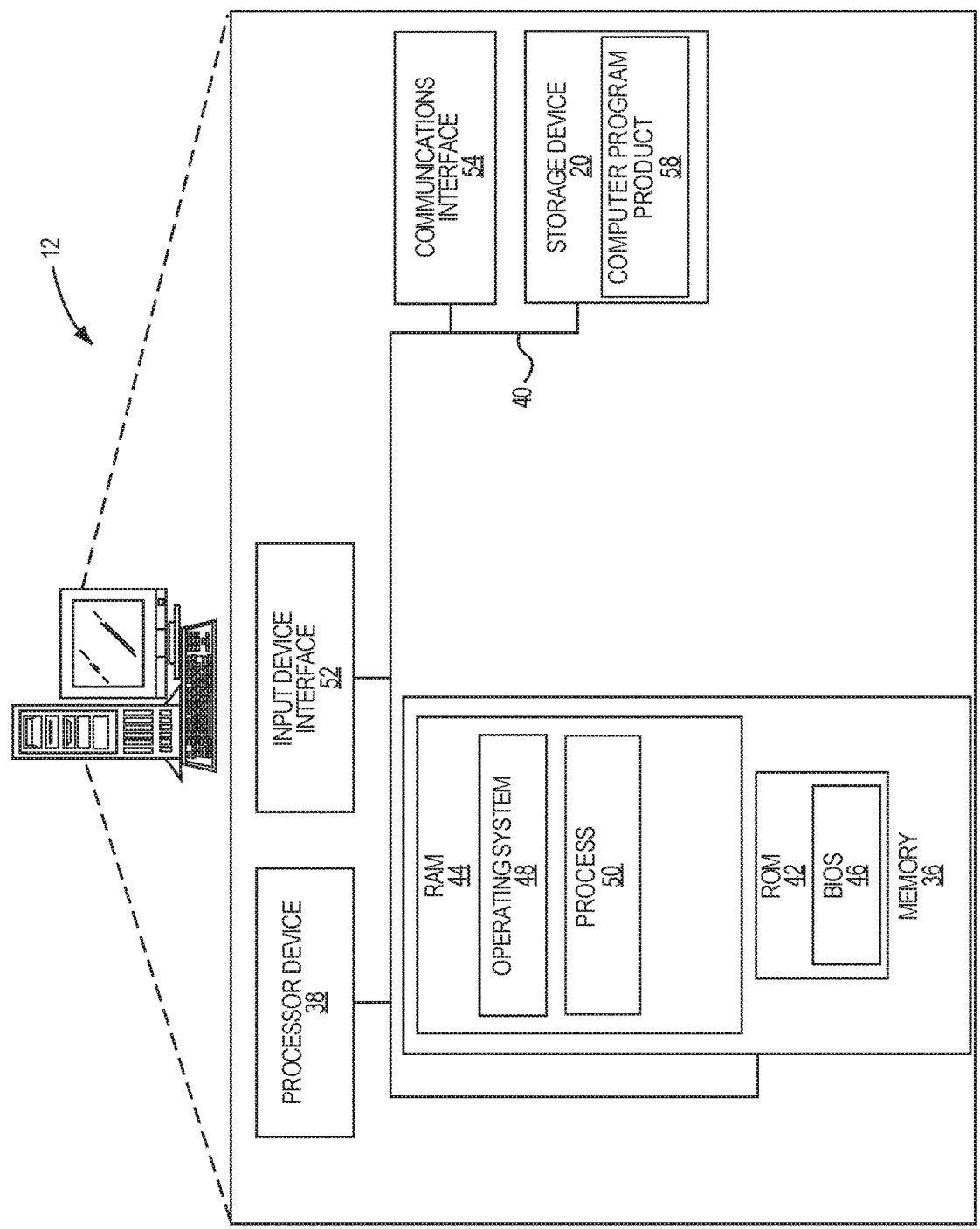
FIG. 5 is a block diagram of a computing device suitable for implementing the examples discussed herein.

FIG. 5 is a block diagram of the computing device 12 suitable for implementing the examples discussed herein. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 38, the memory 36, and a system bus 40. The system bus 40 provides an interface for system components including, but not limited to, the memory 36 and the processor device 38. The processor device 38 can be any commercially available or proprietary processor.

The system bus 40 may be any of several types of bus structures that may further interconnect to a memory bus (with or without a memory controller), a peripheral bus, and/or a local bus using any of a variety of commercially available bus architectures. The memory 36 may include non-volatile memory 42 (e.g., read-only memory (ROM), erasable programmable read-only memory (EPROM), electrically erasable programmable read-only memory (EEPROM), etc.), and volatile memory 44 (e.g., random-access memory (RAM)). A basic input/output system (BIOS) 46 may be stored in the non-volatile memory 42 and can include the basic routines that help to transfer information between elements within the computing device 12. The volatile memory 44 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 20 and in the volatile memory 44, including an operating system 48, such as a Linux operating system, and one or more processes 50, such as the automation process 32, the CLI 30, the container engine 14, the containers 16, and the components 18, which may implement the functionality described herein in whole or in part.

All or a portion of the examples may be implemented as a computer program product 58 stored on a transitory or non-transitory computer-usable or computer-readable storage medium, such as the storage device 20, which includes complex programming instructions, such as complex computer-readable program code, to cause the processor device 38 to carry out the steps described herein. Thus, the computer-readable program code can comprise software instructions for implementing the functionality of the examples described herein when executed on the processor device 38.

An operator may also be able to enter one or more configuration commands through a keyboard (not illustrated), a pointing device such as a mouse (not illustrated), or a touch-sensitive surface such as a display device. Such input devices may be connected to the processor device 38 through an input device interface 52 that is coupled to the system bus 40 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 54 suitable for communicating with the network 34 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   initiating a block storage service that comprises a scheduler component, a volume component, and an application programming interface (API) component in independent containers, by:
   initiating, by at least one computing device, the scheduler component of the block storage service to execute in a first container on the at least one computing device via a containerization technology executing on the at least one computing device, wherein the scheduler component is configured to receive a request for a new volume from the API component;
   mounting to the first container a log volume that is mounted to a host operating system executing on the at least one computing device to allow the scheduler component access to the log volume;

initiating, by the at least one computing device, the API component of the block storage service to execute in a second container on the at least one computing device via the containerization technology, wherein the API component is configured to communicate a volume management request to the volume component;

mounting to the second container the log volume to allow the API component access to the log volume of the host operating system;

initiating, by the at least one computing device, the volume component of the block storage service in a third container via the containerization technology; and mounting to the third container a device volume maintained by the host operating system to allow the volume component access to the device volume of the host operating system.

2. The method of claim 1 further comprising:

initiating, by the at least one computing device, a backup component of the block storage service in a fourth container via the containerization technology; and mounting to the fourth container the log volume to allow the backup component access to the log volume of the host operating system.

3. The method of claim 1 wherein the scheduler component is configured to:

receive the request for the new volume;

determine a particular backend storage device of a plurality of backend storage devices; and forward the request and an identifier of the particular backend storage device to the volume component.

4. The method of claim 1 wherein the API component is configured to:

expose an API to external processes for invocation; and forward a request received via the API to either the scheduler component or the volume component.

5. The method of claim 1 wherein the volume component is configured to:

receive the volume management request from the API component and/or the scheduler component;

determine a backend device to which the volume management request pertains; and communicate the volume management request to a device driver associated with the backend device.

6. The method of claim 1 wherein a first computing device initiates the scheduler component in the first container to execute on the first computing device, a second computing device initiates the API component in the second container to execute on the second computing device, and a third computing device initiates the volume component in the third container to execute on the third computing device.

7. The method of claim 1 wherein the containerization technology comprises a container engine, the container engine executing within an operating system environment of the at least one computing device, and wherein the log volume is managed by the operating system environment.

8. The method of claim 1 wherein the first container and the second container are initiated to execute concurrently, and share access to the log volume.

9. The method of claim 1 wherein the containerization technology comprises Docker containerization technology.

10. The method of claim 1 further comprising mounting to the third container a run volume to allow the volume component access to the run volume maintained by the host operating system.

11. A computing device, comprising:

a memory; and a processor device coupled to the memory to:

initiate a block storage service that comprises a scheduler component, a volume component, and an application programming interface (API) component in independent containers, by:

initiating the scheduler component of the block storage service to execute in a first container on the computing device via a containerization technology executing on the computing device, wherein the scheduler component is configured to receive a request for a new volume from the API component;

mounting to the first container a log volume that is mounted to a host operating system executing on the computing device to allow the scheduler component access to the log volume;

initiating the API component of the block storage service to execute in a second container on the computing device via the containerization technology wherein the API component is configured to communicate a volume management request to the volume component;

mounting to the second container the log volume to allow the API component access to the log volume of the host operating system;

initiating the volume component of the block storage service in a third container via the containerization technology; and mounting to the third container a device volume maintained by the host operating system to allow the volume component access to the device volume of the host operating system.

12. The computing device of claim 11 wherein the scheduler component is configured to:

receive the request for the new volume;

determine a particular backend storage device of a plurality of backend storage devices; and forward the request and an identifier of the particular backend storage device to the volume component.

13. The computing device of claim 11 wherein the API component is configured to:

expose an API to external processes for invocation; and forward a request received via the API to either the scheduler component or the volume component.

14. The computing device of claim 11 wherein the volume component is configured to:

receive the volume management request from the API component and/or the scheduler component;

determine a backend device to which the volume management request pertains; and communicate the volume management request to a device driver associated with the backend device.

15. The computing device of claim 11 wherein the containerization technology comprises a container engine, the container engine executing within an operating system environment of the computing device, and wherein the log volume is managed by the operating system environment.

16. A computer program product stored on a non-transitory computer-readable storage medium and including instructions configured to cause a processor device to:

initiate a block storage service that comprises a scheduler component, a volume component, and an application programming interface (API) component in independent containers, by:

initiating the scheduler component of the block storage service to execute in a first container on at least one computing device via a containerization technology executing on the at least one computing device, wherein the scheduler component is configured to receive a request for a new volume from the API component;

mounting to the first container a log volume that is mounted to a host operating system executing on the at least one computing device to allow the scheduler component access to the log volume;

initiating the API component of the block storage service to execute in a second container on the at least one computing device via the containerization technology wherein the API component is configured to communicate a volume management request to the volume component;

mounting to the second container the log volume to allow the API component access to the log volume of the host operating system;

initiating the volume component of the block storage service in a third container via the containerization technology; and mounting to the third container a device volume maintained by the host operating system to allow the volume component access to the device volume of the host operating system.

17. The computer program product of claim 16 wherein the scheduler component is configured to:
   receive the request for the new volume;
   determine a particular backend storage device of a plurality of backend storage devices; and
   forward the request and an identifier of the particular backend storage device to the volume component.

18. The computer program product of claim 16 wherein the API component is configured to:
   expose an API to external processes for invocation; and
   forward a request received via the API to either the scheduler component or the volume component.

19. The computer program product of claim 16 wherein the volume component is configured to:
   receive the volume management request from the API component and/or the scheduler component;
   determine a backend device to which the volume management request pertains; and
   communicate the volume management request to a device driver associated with the backend device.

20. The computer program product of claim 16 wherein the containerization technology comprises a container engine, the container engine executing within an operating system environment of at least one computing device, and wherein the log volume is managed by the operating system environment.

* * * * *